US005727406A

United States Patent [19]

Banducci

[11] Patent Number: 5,727,406

[45] Date of Patent: Mar. 17, 1998

[54] LEVER ASSEMBLY FOR HIGH TORQUE LOAD

[75] Inventor: David Banducci, Branford, Conn.

[73] Assignee: Sargent Manufacturing Company, New Haven, Conn.

[21] Appl. No.: 608,824

[22] Filed: Feb. 29, 1996

[51] Int. Cl.$^6$ .......... B60R 25/02

[52] U.S. Cl. .......... 70/224; 292/336.3; 292/356

[58] Field of Search .......... 70/224, 452; 292/336.3, 292/347, 348, 356, 357, DIG. 61

[56] References Cited

U.S. PATENT DOCUMENTS

| | | | |
|---|---|---|---|
| 162,418 | 4/1875 | Rebstock | 292/347 |
| 3,427,061 | 2/1969 | McMeen et al. | 292/353 |
| 3,549,184 | 12/1970 | Anderson | 292/195 |
| 4,202,575 | 5/1980 | Bates | 292/347 |
| 4,569,547 | 2/1986 | Fayerman et al. | 292/347 |
| 4,773,684 | 9/1988 | Dieckmann et al. | 292/357 |
| 4,789,191 | 12/1988 | Dennis | 292/347 |
| 4,852,922 | 8/1989 | Shih | 292/336.3 |
| 4,869,083 | 9/1989 | DeMarseilles et al. | 70/224 |
| 4,920,773 | 5/1990 | Surko, Jr. | 70/224 |
| 4,921,289 | 5/1990 | Shen | 292/336.3 |
| 4,930,822 | 6/1990 | Shen | 292/357 |
| 4,998,760 | 3/1991 | Nixon et al. | 292/347 |
| 5,067,758 | 11/1991 | Fann et al. | 292/347 |
| 5,118,152 | 6/1992 | Lin | 292/356 |
| 5,145,223 | 9/1992 | Robida et al. | 292/347 |
| 5,149,155 | 9/1992 | Caeti et al. | 292/336.3 |
| 5,177,987 | 1/1993 | Shen | 70/224 |
| 5,265,924 | 11/1993 | Kim | 292/336.3 |
| 5,441,318 | 8/1995 | Ghostley | 292/356 X |
| 5,481,890 | 1/1996 | Millman | 70/224 |
| 5,564,296 | 10/1996 | Theriault et al. | 292/336.3 X |

FOREIGN PATENT DOCUMENTS

| | | |
|---|---|---|
| 92-6696 | 8/1994 | Rep. of Korea . |
| 204877 | 3/1966 | Sweden . |
| 157555 | 5/1991 | Taiwan . |
| 81217323 | 12/1992 | Taiwan . |
| 250866 | 7/1995 | Taiwan . |
| 258270 | 9/1995 | Taiwan . |
| 261178 | 10/1995 | Taiwan . |
| 875933 | 8/1961 | United Kingdom . |

*Primary Examiner*—Suzanne Dino
*Attorney, Agent, or Firm*—DeLio & Peterson, LLC

[57] ABSTRACT

A lever assembly for a door lock comprising a lock cylinder and a pair of housings, each of which being mounted to a respective shank portion of the lock cylinder. Each housing has a circular channel formed in one side thereof. Each housing defines a lip that has a substantially planar perimetrical edge and includes a pair of travel stop tabs and a pair of spring holder tabs extending from the channel wall. In a preferred embodiment, the travel stop tabs of each housing member are less than 180° apart, and the spring holder tabs are diametrically positioned with respect to one another. The lever assembly further comprises a pair of annular rotatable members, each of which being rotatably mounted on the lip of a respective housing and having one protrusion formed on the periphery thereof which extends substantially parallel to the shank, a segment extending radially from the periphery of the rotatable member to contact one of the travel stops, and a projection extending radially inward from the periphery of the rotatable member and engaged with a slot of a respective shank portion. The lever assembly further includes a pair of spring members, each of which being mounted on a respective rotatable member and having bent ends engaging simultaneously one of the spring holder tabs of a respective housing and the protrusion of the respective rotatable member, and a pair or retainers. Each retainer is positioned over a channel of and attached to a respective housing to cover the rotatable member and spring member. Each retainer is substantially planar and has a substantially smooth perimetrical edge.

34 Claims, 5 Drawing Sheets

LEVER ASSEMBLY FOR HIGH TORQUE LOAD

BACKGROUND OF THE INVENTION

1. Field of the Invention

The present invention relates to an improved lever assembly for use with door locks.

2. Description of Conventional Lever Assemblies

Public buildings such as schools, courthouses etc., and commercial buildings typically have doors that use lock assemblies that are designed to facilitate usage by handicapped or disabled people. These lock assemblies utilize elongated levers to increase leverage as well as an additional spring assembly that returns the lever to its initial position after the lever is turned and released. However, since the lever is relatively long, a significant torsional force is produced when the lever is turned. Consequently, such torsional force damages the components of the lock assembly. Furthermore, the aforementioned torsional force also causes the lock assembly to become dislodged from the door to which it was attached.

Conventional lock or lever assemblies typically utilize a subassembly comprising (i) inside and outside mounting members wherein each mounting member includes two (2) diametrically positioned studs for coupling the mounting members together, two locking slots and a stepped portion, (ii) inside and outside rotatable members wherein each rotatable member is mounted on the outside of a respective mounting member, each mounting member having a radially protruded segment and two (2) protrusions parallel to the shank of the lever assembly, (iii) inside and outside spring members mounted on the inside and outside rotatable members, respectively, wherein both ends of each spring member are being bent and engaged with two (2) protrusions of the respective rotatable members, and (iv) inside and outside retainers mounted over the inside and outside spring members, respectively, wherein each retainer has two protruded segments that are oppositely formed at the periphery thereof and a radially, inwardly extending segment and wherein the two (2) protruded segments are inserted into the corresponding slots of the respective mounting members, and the radial segment is positioned between the bent ends of the respective spring members.

There are distinct disadvantages to utilizing the subassembly described above:

(i) the retainers described above have significant rotational loads thereon due to the high torque required to move the lever. Such rotational loads cause the retainers to become loose allowing the spring members to dislodge from the rotating member thereby necessitating repair or replacement of the lever assembly;

(ii) the retainers described above are complex in design due to the utilization of the two (2) protruded segments that are oppositely formed at the periphery of the retainers, and the radially, inwardly extending segment, all of which add to the manufacturing costs of the lever assembly; and (iii) the two (2) diametrically positioned studs on the mounting members significantly limit the ability to adapt the lever assembly to preexisting openings in the door to which the lever assembly is attached.

It is therefore an object of the present invention to provide a new and improved lever assembly configured for high torsional loads and which is suitable for commercial use.

It is another object of the present invention to provide a new and improved lever assembly which minimizes the torsional or rotational load on the retainers used to retain the spring members on the mounting members.

It is another object of the present invention to provide a new and improved lever assembly which may be adapted to a variety of preexisting openings in the door.

It is another object of the present invention to provide a new and improved lever assembly that is configured to permit more than two (2) fasteners, screws or bolts to be used to secure the lever assembly to the door.

A further object of the invention is to provide a new and improved lever assembly that can be manufactured at a relatively low cost.

Still other objects and advantages of the invention will in part be obvious and will in part be apparent from the specification.

SUMMARY OF THE INVENTION

The above and other objects and advantages, which will be apparent to those skilled in the art, are achieved in the present invention which is directed to, in a first aspect, a lever assembly for a door lock comprising:

A) a lock cylinder having a first side and a second side, the cylinder including:

a shank having a first portion and second portion extending from the first and second sides, respectively, the first shank portion having a threaded portion adjacent the first side of the cylinder and defining a slot, the second portion defining a slot;

B) a pair of spacer plates, each of which having a central opening therethrough and mounted on a respective shank portion;

C) a nut threadedly engaged to the threaded portion of the first shank portion for fastening one of the spacer plates against the first side of the cylinder, the other spacer plate being attached to the second side of the cylinder;

D) a pair of housing members, each of which being mounted to a respective shank portion, each housing member having front and rear sides and a central opening for receiving a respective shank portion, the rear side of each housing member receiving a respective spacer plate, the housing members being fastened together, each housing member having a circular channel formed in the front side, the channel being coaxial with the central opening and having a wall, each housing member defining a lip in the channel that is circumferential of the central opening of the housing member, the lip having a substantially planar perimetrical edge, each housing having a pair of travel stop tabs and a pair of spring holder tabs, the travel stop tabs being oppositely formed in and extending from the wall to the channel, the spring holder tabs comprising first and second spring holder tabs oppositely formed in and extending from the wall into the channel;

E) a pair of annular rotatable members, each of which having a wall portion and rotatably mounted on the lip of a respective housing member, each rotatable member having one protrusion formed on the periphery thereof that extends substantially parallel to the shank, a segment extending radially from the periphery of the rotatable member so as to contact one of the travel stops, and a projection extending radially inward from the periphery of the wall portion of the rotatable member and engaged with the slot or a respective shank portion;

F) a pair of spring members, each of which mounted on the wall portion of a respective rotatable member, each spring member having bent ends engaging simultaneously the first spring holder tab of a respective housing member and the protrusion of the respective rotatable member;

G) a pair of retainers, each of which being positioned over the channel of and attached to the front side of a respective housing member;

H) a pair of covers, each cover corresponding to a respective side of a door and having a front side and a rear side, each cover having a peripheral portion inwardly extending substantially parallel to the shank, the peripheral portion and the rear side cooperating to define an interior of the cover, the cover being attached to a respective housing member so that the cover interior receives the respective housing member and so that the retainer is adjacent the rear side of the cover; and I) a pair of levers, each of which having a hollow shaft defining an elongated slot, the shaft being mounted to a respective shank portion such that the radially extending projection of a corresponding rotatable member is engaged with the slot of the shaft.

In a preferred embodiment, the lever assembly of the present invention further comprises a pair of washers, each of which being positioned over a respective spring member. Each washer has a central opening for receiving the perimetrical edge of the wall of a respective rotatable member. Preferably, each retainer is substantially planar and has a substantially smooth perimetrical edge.

In a preferred embodiment, one of the housing members has a plurality of pairs of diametrically opposed thru-holes for receiving corresponding fastening screws. The plurality of pairs of thru-holes comprises three (3) pairs of thru-holes wherein three (3) of the thru-holes are positioned in a top portion of one of the housing members and three (3) of the thru-holes are positioned at a bottom portion of the housing member. Each thru-hole is diametrically positioned with respect to a corresponding thru-hole. Preferably, the three (3) thru-holes at the top portion of the housing member are spaced about 45° apart, and the three (3) thru-holes at the bottom portion of the housing member are spaced about 45° apart. The other housing member has a plurality of threaded inlets formed on a rear side thereof which are coaxially aligned with the plurality of thru-holes of the first housing member.

In a preferred embodiment, the lever assembly of the present invention comprises at least two (2) studs, each of which having a threaded end threadedly engaged with a corresponding threaded inlet and a threaded bore formed in the end of the stud opposite the threaded end. Each stud extends through corresponding openings or gaps in the spacer plates. The studs pass over or under the lock cylinder, but do not penetrate the lock cylinder. The lever assembly further comprises at least two (2) screws, each of which being disposed in a corresponding thru-hole of the first housing member and threadedly engaged with the threaded bore of a corresponding stud in order to connect the housing members together.

In a preferred embodiment, the travel stop tabs of each housing member are less than 180° apart, the spring holder tabs of each housing member are diametrically positioned with respect to one another and the first spring holder tab extends farther into the channel than the second spring holder tab.

In a preferred embodiment, the retainers are staked to the housing member in order to prevent axial movement of the retainer. Each retainer is supported by the travel stop tabs and the spring holder tabs of a respective housing member. Each retainer has an integral rib formed therein to provide rigidity.

Preferably, each housing member has a pair of diametrically positioned grooves formed in the perimetrical end thereof, and each cover has a pair of diametrically positioned dimples formed on the peripheral portion. The dimples of the cover are engaged with the grooves of the housing members in order to prevent the covers from being dislodged from the housing members.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

Figure 1:
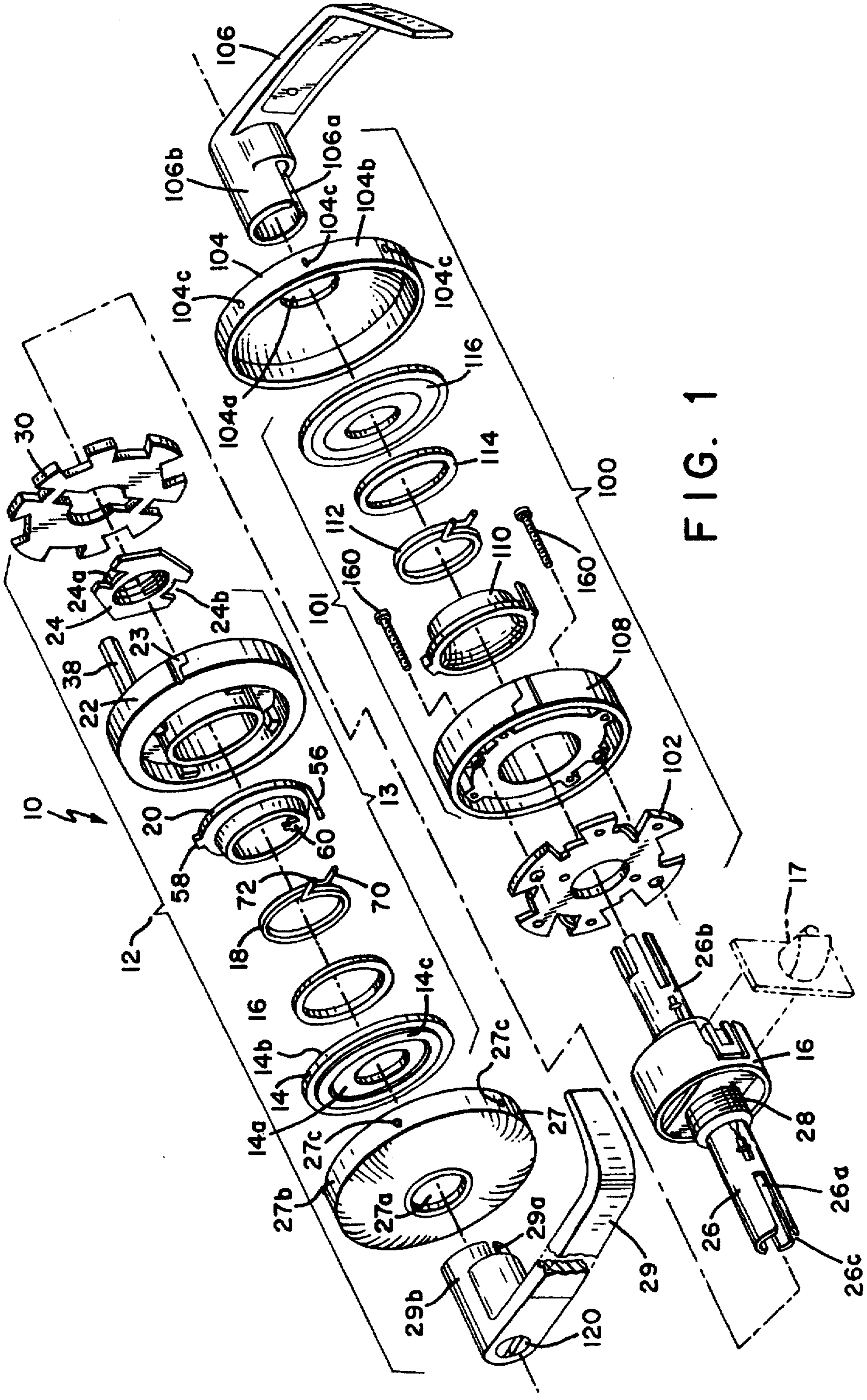
FIG. 1 is an exploded view of the lever assembly of the present invention.

In describing the preferred embodiments of the present invention, reference will be made herein to FIGS. 1–17 of the drawings in which like numerals refer to like features of the invention. Features of the invention are not necessarily shown to scale in the drawings.

Referring to FIG. 1, lever assembly 10 of the present invention comprises lever assemblies 12 and 100 of the present invention and conventional lock cylinder or body 16.

Lock cylinder 16 has shank 26 extending therethrough such that outside shank portion **26*a* and inside shank portion 26*b* extend from either side thereof. Cylinder 16 has a threaded portion 28 formed on the portion of outside shank portion 26*a* adjacent to cylinder 16**.

Assembly 12 comprises spring cartridge assembly 13, nut 24, cover 27, lever 29 and spacer plate 30. Spring cartridge assembly 13 comprises retainer 14, washer 16, spring member 18, annular rotatable member 20 and housing 22.

Assembly 100 comprises spring cartridge assembly 101, spacer plate 102, cover 104 and lever 106. Spring cartridge assembly 101 comprises housing 108, rotatable member 110, spring 112, washer 114 and retainer 116.

Figure 2:
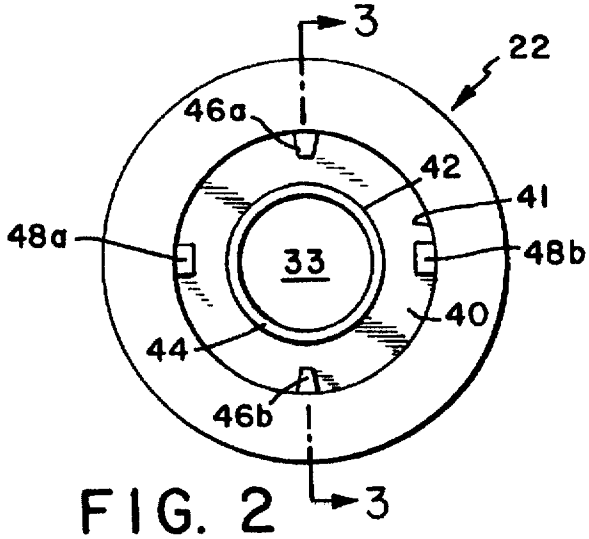
FIG. 2 is a top plan view of a first housing depicted in FIG. 1.
Figure 3:
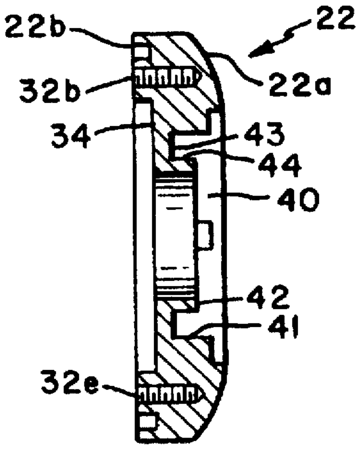
FIG. 3 is a side elevational view in cross section taken along line 3—3 in FIG. 2.
Figure 4:
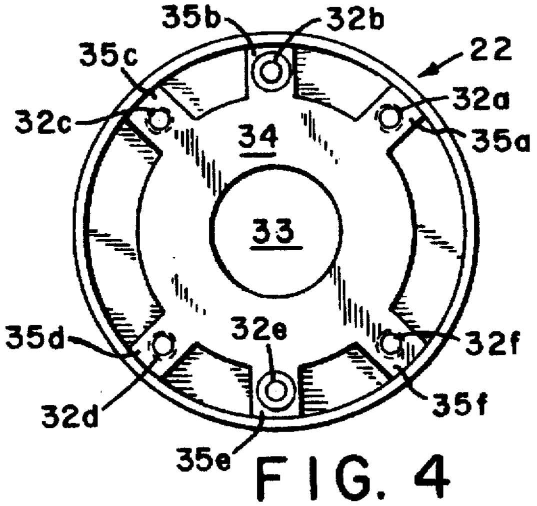
FIG. 4 is a rear view of the housing shown FIG. 2.

Referring to FIGS. 2–4, housing 22 has integrally formed, raised portion 34 formed on rear side **22*b*. Raised portion 34 includes integral radially extending segments 35*a–f*. Six (6) threaded screw inlets 32*a–f* are formed in segments 35*a–f*, respectively. Inlets 32*a* and 32*c* are preferably spaced about 45 degrees from inlet 32*b*. Similarly, inlets 32*d*, and 32*f* are spaced about 45 degrees from inlet 32*e*. Each inlet is diametrically positioned 180 degrees from a corresponding inlet. For example, inlet 32*b* is positioned 180 degrees from inlet 32*e*. Similarly, inlets 32*a* and 32*c* are positioned 180 degrees from inlets 32*d* and 32*f***, respectively.

Figure 8:
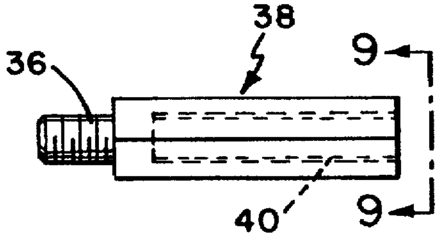
FIG. 8 is a side view of a stud used with the first housing of FIG. 1.
Figure 9:
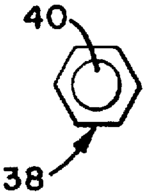
FIG. 9 is an end view taken along line 9—9 in FIG. 8.

Screw receiving inlets **32*a–f* receive threaded ends 36 of hexagonally shaped studs 38 (see FIGS. 8 and 9). At least two (2) studs 38 are threadedly engaged with corresponding threaded inlets formed on rear side 22*b*. Studs 38 can be moved to any of the inlets 32*a–f*. For example, if a pair of studs 38 are used, studs 38 can be moved to any pair of diametrically positioned screw receiving inlets, e.g. 32*a* and 32*d*, 32*b* and 32*e*, 32*c* and 32*f*. Since studs 38 are removably inserted into screw receiving inlets 32*a–f*, lever assembly 10 can be disassembled so as to position studs 38 in a different configuration, e.g. move studs 38 from inlets 32*b* and 32*f* to 32*a* and 32*d*. Thus, inlets 32*a–f* allow lever assembly 10 to be adapted to doors having pre-existing holes or openings. Furthermore, more than two (2) studs 38 may be used to secure lever assembly 10 to a door. Each stud 38 has a threaded bore 40** formed therein for receiving other fastening screws. This be will discussed further below.

In an alternate embodiment, inlets **32*a–f* are not threaded but are configured as holes or openings sized for receiving corresponding studs that are attached to other lever assembly components. Such a configuration would permit studs attached to other lock assembly components to "pass through" housing 22. Both embodiments of housing 22 are used in conjunction with spacer plate 30 (see FIG. 14**).

Figure 14:
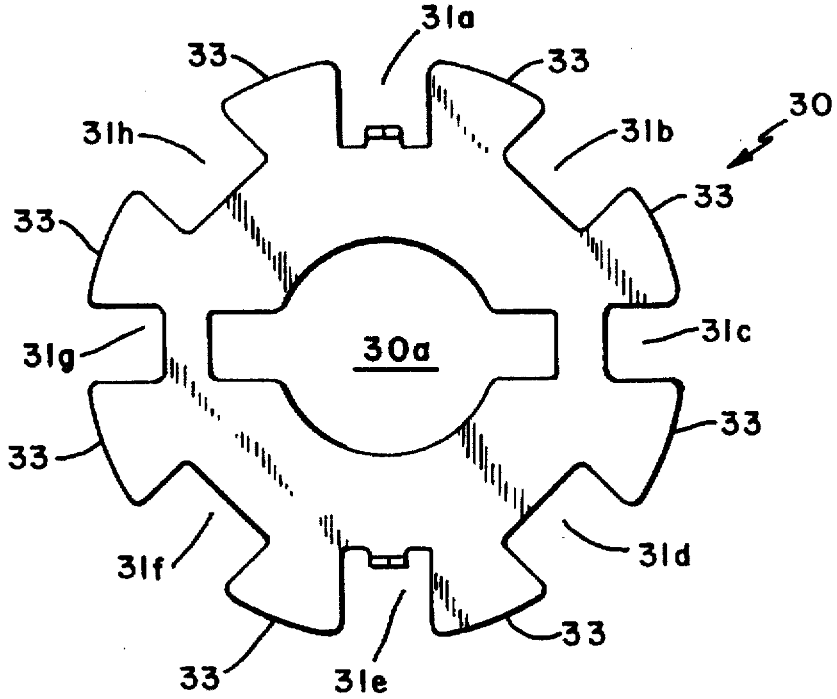
FIG. 14 is a top plan view of a first spacer plate depicted in FIG. 1.
Figure 15:
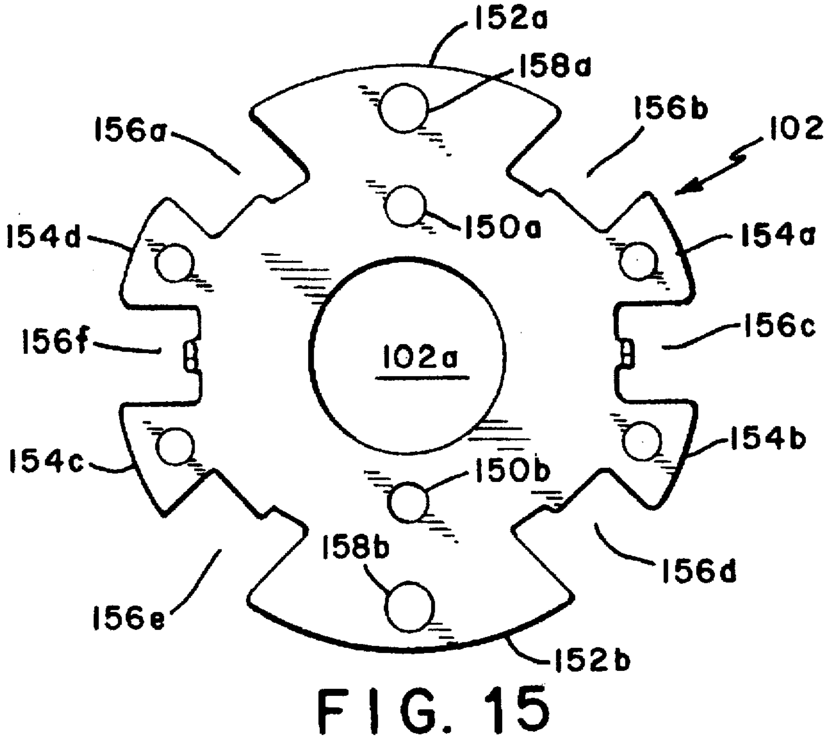
FIG. 15 is a top plan view of a second spacer plate depicted in FIG. 1.

Housing 22 is fitted over shank portion **26*a* such that studs 38 extend through corresponding gaps or spaces 31*a–h* in spacer plate 30 (see FIG. 14). Referring to FIGS. 2–4, housing 22 defines recessed circular channel 40 having outside perimeter wall 41. Circumferentially formed lip 42 is formed in the center of channel 40 and is coaxial with housing central opening 33. Lip 42 has an upstanding wall 44 which extends longitudinally and parallel with shank 26. Referring to FIG. 2, integral or cast travel stop tabs 46*a* and 46*b* are formed on and extend from wall 41. Tabs 46*a* and 46*b* extend into channel 40 and are preferably less than 180 degrees apart. Preferably, travel stop tabs 46*a* and 46*b* are between about 177 and 179 degrees, inclusive, apart from one another. The function of such a structure will be discussed below. Each tab 46*a* and 46*b* has a taper wherein the portion of each tab that is contiguous with wall 41 is wider than the end of the tab opposite the tab portion contiguous with wall 41. The function of tabs 46*a* and 46*b* will be discussed in detail below. Spring-holder tabs 48*a* and 48*b* are formed on and extend from wall 41. Tabs 48*a* and 48*b* extend into channel 40 and are diametrically positioned with respect to one another, i.e. 180 degrees apart. Tabs 48*a* and 48*b* have a substantially rectangular shape. The distance that tab 48*b* extends into channel 40 is greater than the distance tab 48*a* extends into channel 40. The function of tabs 48*a* and 48*b*** will be discussed in detail below.

Spacer plate 30 has central opening **30*a* and radially extending segments 33. Gaps or spaces 31*a–h* separate segments 33. Spacer plate 30 is fitted onto shank portion 26*a* and is secured to lock cylinder or body 16 by hexagonal nut 24 which is threadedly engaged with threaded portion 28 of shank portion 26*a*. Housing 22 is mounted to shank portion 26*a* such that rear side 22*b* is fitted over and completely covers spacer plate 30**.

Figure 10:
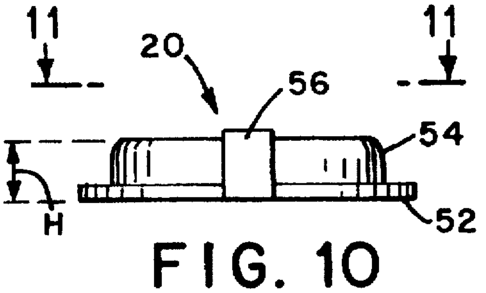
FIG. 10 is a side elevational view of a rotatable member depicted in FIG. 1.
Figure 11:
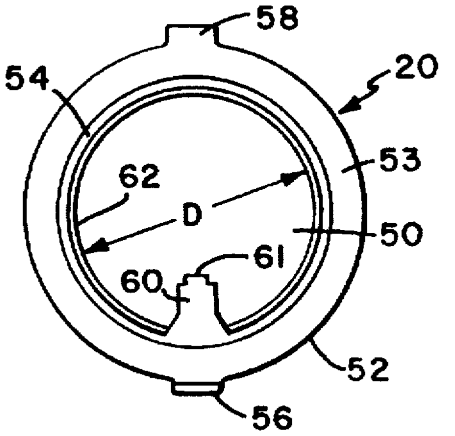
FIG. 11 is a top plan view of the rotatable member taken along line 11—11 in FIG. 10.

Referring to FIGS. 10 and 11, annular rotatable member 20 defines opening 50 and comprises substantially flat rim portion 52 and wall 54 which extends upward from flat rim portion 52. The diameter D of opening 50 is slightly larger than the outer diameter of lip 42 of housing 22. The thickness of portion 52 and the height of wall 54 result in an overall height H that is greater than the height of lip 42 of housing 22. Protrusion 56 is formed on the perimetrical edge of portion 52 and extends upward therefrom in a direction substantially parallel to shank 26. Protrusion 56 has a width that is substantially equal to the widths of spring holder tabs **48*a* and 48*b*. Portion 52 also defines radially extending projection 58. Protrusion 56 and projection 58 are diametrically positioned with respect to one another, i.e. 180 degrees apart. Radially extending projection 60 is formed on upper perimetrical edge 62 of wall 54 and extends to a narrow portion 61. Projection 60 is diametrically positioned with respect to projection 58. Protrusion 56, projection 58 and projection 60** are all colinearly aligned with one another.

Recessed circular channel 40 of housing member 22 receives annular rotatable member 20 such that lip 42 of housing 22 is disposed in opening 50 of rotatable member 20, and flat portion 52 of member 20 contacts bottom surface 43 of channel 40. Thus, member 20 is able to rotate upon lip 42. Since tab **48*b* extends farther into channel 40 than tab 48*a*, incorrect assembly of the lever assembly of the present invention is prevented, e.g. rotatable member 20 will not rotate properly if it is inserted into channel 40 such that radial projection 58 is between travel stop 46*a* and spring holder tab 48*b*, or between travel stop 46*b* and spring holder tab 48*b***.

Figure 12:
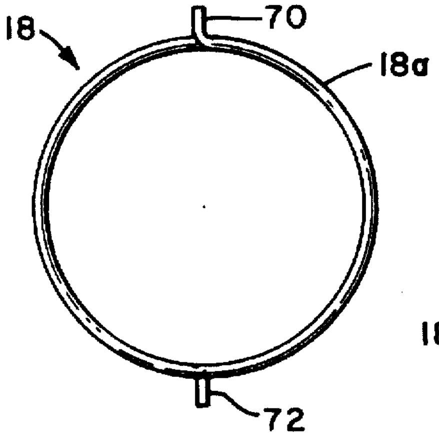
FIG. 12 is a top plan view of a spring member depicted in FIG. 1.
Figure 13:
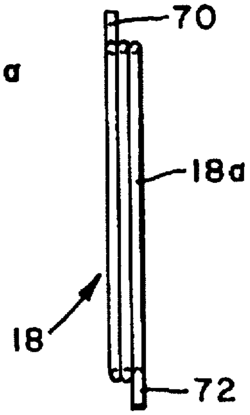
FIG. 13 is a side elevational view of the spring member shown in FIG. 12.

Referring to FIGS. 12 and 13, spring member 18, shown without compression, is of the clock-type design. Ears or ends 70 and 72 are oriented substantially 90 degrees with respect to winding **18*a* and positioned about 180 degrees from each other. Spring 18** is preferably fabricated from about 2½ loops of spring wire.

Figure 16:
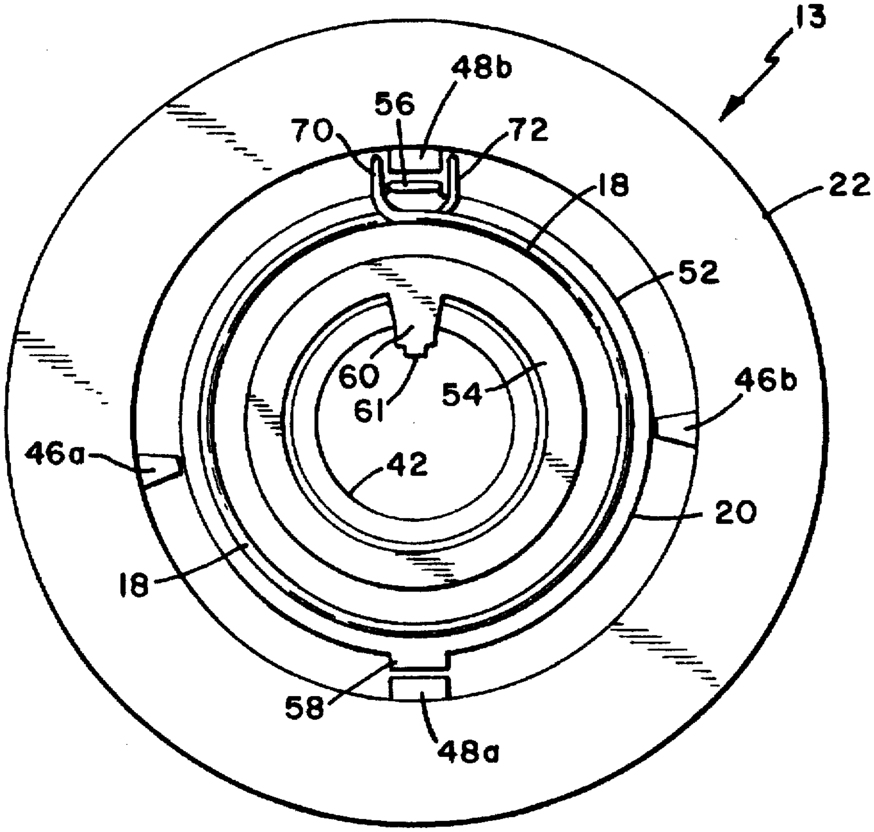
FIGS. 16 and 17 illustrate the interaction of the housing of FIG. 2, the rotatable member of FIG. 11, and the spring member of FIG. 12.
Figure 17:
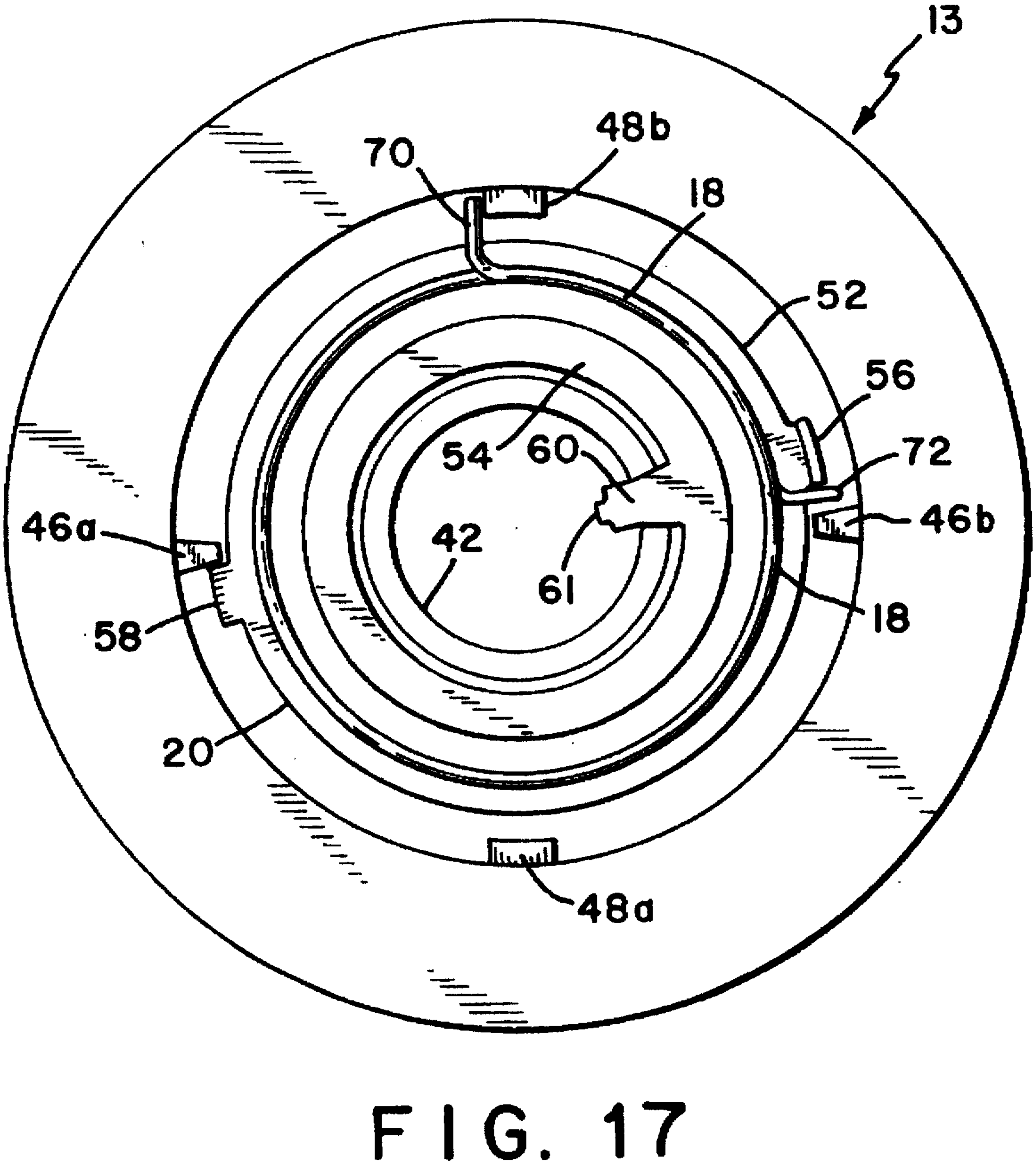

Spring cartridge assembly 13 provides rotational assistance to lock body or cylinder 16 in returning lever 29 to a horizontal position after actuation. FIG. 16 illustrates the interaction of housing 22, rotatable member 20, and spring 18. Retainer 14 and washer 16 are not shown in FIG. 16 in order to facilitate description of the interaction of housing 22, rotatable member 20 and spring 18. Projection 58 cooperates with travel stop tabs **46*a* and 46*b* to limit rotation of member 20 to less than 180 degrees. Spring member 18 is wound along the outer surface of wall 54 of rotatable member 18. Spring 18 is wound in a manner such that ears or ends 70 and 72 engage spring holder tab 48*b* and protrusion 56 simultaneously. Referring to FIG. 17, when rotatable member 20 rotates clockwise, then protrusion 56 moves end 72 in the clockwise direction. Rotatable member 20 rotates in the clockwise direction until projection 58 contacts travel stop tab 46*a*. Such clockwise movement will wind spring member 18. Since travel stops 46*a* and 46*b* are less than 180° apart, protrusion 56 is stopped prior to contacting travel stop 46*b* thereby preventing spring end 72 of spring 18 from being compressed between travel stop 46*b* and protrusion 56. Thus, such a configuration prevents damage to spring end 72. When rotatable member 20 rotates in the counter-clockwise direction, then protrusion 56 moves end 70 in the counter-clockwise direction until radial projection 58 contacts travel stop 46b. End 72 of spring 18 does not contact travel stop tab 46a when radial projection 58 contacts travel stop 46b. Thus, spring end 72 is never compressed between travel stop 46a and protrusion 56**.

Radially extending projection 60 engages elongated slot 29a of shaft portion 29b of lever 29 and elongated slot 26c formed in shaft portion 26a. Thus, projection 60 functions as a means to align slot 26c of shank portion 26a with slot 29a of lever 29 to facilitate attachment of shaft portion 29b of lever 29 to shank portion 26a, and to transfer the torque or rotational load produced by actuation of lever 29 to shank portion 26a.

Washer 16 (see FIG. 1) is positioned on top of spring member 18 such that it is coaxial with opening 50 of rotatable member 20 and is positioned between protrusion 56 and projection 60.

Referring to FIG. 1, retainer 14 has surface 14a opposite cover 27 and a second surface 14b facing circular channel 40. Retainer 14 has a circumferential rib 14c slightly protruding from surface 14a which provides rigidity and structural support. Retainer 14 has a substantially smooth and continuous perimetrical edge. Retainer 14 is positioned over channel 40 and is supported by tabs 46a, 46b, 48a, and 48b of housing 22 such that retainer 14 covers washer 16, spring 18 and rotatable member 20. Retainer 14 is secured to housing 22 to prevent the retainer from dislodgment thereof or movement in an axial direction (or parallel with shank 16). The rotational forces upon spring member 18 and rotatable member 20 are not translated to retainer 14. Thus, there are no rotational forces upon retainer 14. Retainer 14 is preferably secured to housing 22 by staking, a technique well known in the art. In a preferred embodiment, four (4) staking areas 90 degrees apart are used to secure retainer 14 to housing 22. Thus, retainer 14 does not have or need any projections or tabs formed thereon to prevent rotation thereof.

Spring cartridge assembly 13 limits the angle of rotation through the use of travel stop tabs 46a and 46b (see FIGS. 16 and 17) thereby isolating lock body 16 and latch bolt assembly 17 (shown in phantom) from any torque produced by the rotational loads produced when lever 29 is actuated. Since travel stop tabs 46a and 46b are not diametrically positioned with respect to one another, protrusion 56 cannot contact either spring holder tab 48a or 48b. Such a configuration prevents ends 70 and 72 of spring 18 from being compressed between protrusion 56 and tabs 48a and 48b thereby preventing damage to spring ends 70 and 72. Spring cartridge 13 also increases torsional rigidity of the entire lever assembly 10 due to the utilization of multiple threaded inlets 32a–f in housings 22 which permit at least two (2) studs 38 to be used to interlock housing 22 and housing 108 with each other when installed on a door. This will be discussed below in detail.

Hexagonal nut 24 has two (2) diametrically positioned slots 24a and 24b for allowing screws or other elongated fasteners (not shown) used with lock cylinder 16 to pass through without interference. Nut 24 is threadedly engaged with threaded portion 28 of cylinder 16 and may be adjusted to position spacer plate 30, mounted on shank portion 26a, against lock cylinder 16.

Cover 27 is positioned between lever 29 and retainer 14 and has opening 27a formed therein for receiving shaft portion 29b of lever 29. Cover 27 has a front side opposite lever 29 and a rear side opposite retainer 14. Cover 27 has periphery portion 27b which is inwardly folded and cooperates with the rear side of cover 27 to define an interior area which receives housing member 22 with rotatable member 20, spring 18, washer 16 and retainer 14. Housing member 22 is positioned within the interior area formed at the rear of cover 27 in a manner such that retainer 14 is adjacent, but not in contact with, the rear side of cover 27. Periphery portion 27b has a plurality or equidistantly spaced dimples 27c projecting radially inward which are engaged with corresponding grooves 23 formed in the periphery of housing 22 so as to prevent cover 27 from being dislodged.

Lever 29 includes a conventional key cylinder 120 mounted therein, the structure and function of which is well known in the art.

Spacer plate 102 has central opening 102a and radially extending segments 152a, 152b and 154a–d which are separated by gaps or spaces 156a–f. Segments 152a and 152b have holes 158a and 158b, respectively, which are sized for receiving studs 38. Spacer plate 102 is fitted onto shank portion 26b and is secured to lock cylinder or body 16 a screws (not shown) which extend through openings 150a and 150b and are threadedly engaged with corresponding inlets (not shown) in lock cylinder body 16.

Figure 5:
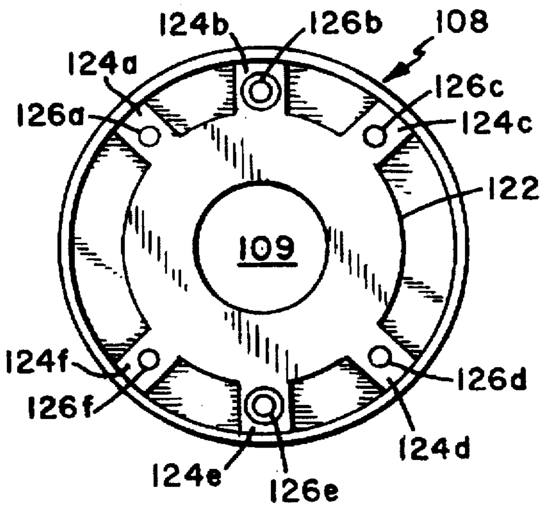
FIG. 5 is a rear view of a second housing shown in FIG. 1.
Figure 6:
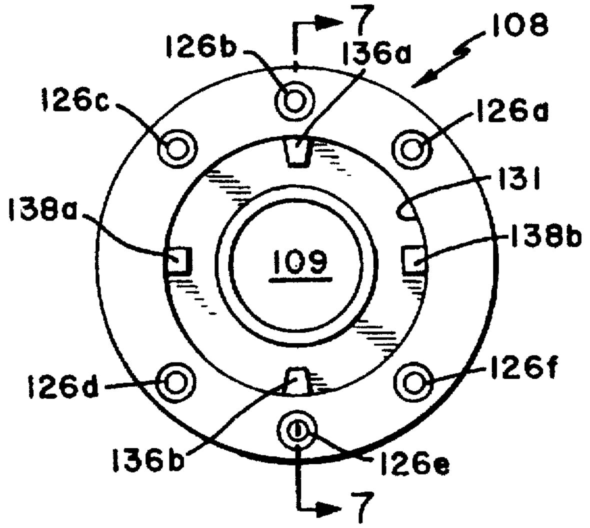
FIG. 6 is a top plan view of the housing of FIG. 5.
Figure 7:
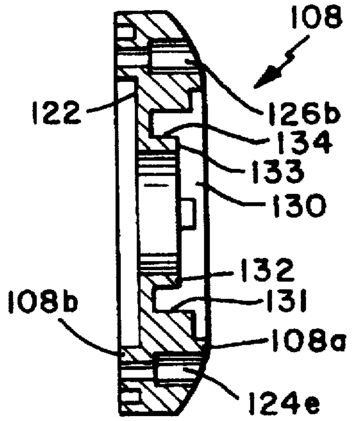
FIG. 7 is a side elevational view in cross section taken along line 7—7 in FIG. 6.

Referring to FIGS. 5–7, housing 108 member has front side 108a and rear side 108b and integrally formed, raised portion 122 formed on rear side 108b. Raised portion 122 includes integrally formed, radially extending segments 124a–f. Six (6) holes 126a–f are formed in corresponding segments 124a–f. Holes 126a and 126c are spaced about 45 degrees from inlet 126b. Similarly, holes 126d and 126f are spaced about 45 degrees from inlet 126e. Each hole is diametrically positioned 180 degrees from a corresponding hole. For example, inlet 126b is positioned 180 degrees from hole 126e. Similarly, holes 126a and 126c are positioned 180 degrees from holes 126d and 126f, respectively. Holes 126b and 126e correspond to and are coaxially aligned with openings 158a and 158b, respectively in spacer plate 102 and to gaps 31a and 31e in spacer plate 30.

Apart from holes 126a–f discussed above, the structure of housing 108 is substantially the same as housing 22. Referring to FIG. 6, housing 108 defines recessed circular channel 130 having outside perimeter wall 131. Circumferentially formed lip 132 is formed in the center of channel 130, is coaxial with housing central opening 109, and has an upstanding wall 134 which extends longitudinally and parallel with shank 26. Lip 132 has a substantially planar perimetrical edge 133. Integral or cast travel stop tabs 136a and 136b are formed on and extend from wall 131. Tabs 136a and 136b extend into channel 130 and are preferably less than 180 degrees apart. Preferably, travel stop tabs 136a and 136b are between about 177 and 179 degrees, inclusive, apart from one another. The function of tabs 136a and 136b is the same as tabs 46a and 46b of housing 22. Each tab 136a and 136b has a taper wherein the portion of each tab that is contiguous with wall portion 131 is wider than the end of the tab opposite the tab portion contiguous with wall 131. Spring-holder tabs 138a and 138b are formed on and extend from wall 131. Tabs 138a and 138b extend into channel 130 and are diametrically positioned with respect to one another, i.e. 180 degrees apart. Tabs 138a and 138b have a substantially rectangular shape. The distance that tab 138b extends into channel 130 is greater than the distance tab 138a extends into channel 130. The function of tabs 138a and 138b is the same as the function of tabs 48a and 48b of housing 22.

Rotatable member 110 is structurally identical to rotatable member 20. Furthermore, spring 112, washer 114, and retainer 116 are structurally identical to spring 18, washer 16 and retainer 14, respectively. Rotatable member 110, spring 112, washer 114 and retainer 116 are mounted to housing 108 in a manner that is identical to the manner in which rotatable member 20, spring 18, washer 16 and retainer 14 are mounted to housing 22. Thus, FIGS. 16 and 17 may also be used to illustrate the interaction between housing member 108, rotatable member 110, and spring 112. Since spring holder tabs 138b extends farther into channel 130 than tab 138a, incorrect assembly of the lever assembly of the present invention is prevented, e.g. rotatable member 110 will not rotate properly if it is inserted into channel 130 such that the radial projection of rotatable member 110 (see FIG. 1) is between travel stop 136a and spring holder tab 138a, or between travel stop 136a and spring holder tab 138b.

As stated above, FIGS. 16 and 17 may be used to illustrate the interaction of housing member 108 with rotatable member 110 and spring 112. For the same reasons mentioned above for the description of FIGS. 16 and 17, the ends of spring 112 are never compressed between the protrusion of rotatable member 110 and travel stop tabs 136 or 136b.

Spring cartridge 101, i.e., housing 108, rotatable member 110, spring 112, washer 114 and retainer 116, is fitted onto inner shank portion 26b and secured to housing 22 by the engagement of studs 38 and screws 160. Any of the gaps 31a–h of spacer plate 30, or holes 158a, 158b or gaps 152a–f of spacer plate 102 may be used in conjunction with studs 38 and screws 160 to fasten housings 22 and 108 together. For example, studs 38, if threadedly engaged with inlets 32b and 32e, can be inserted through diametrically positioned gaps 31a and 31e of spacer plate 30 and through diametrically positioned holes 158a and 158b formed in spacer plate 102. Screws 160 are inserted through holes 126b and 126e of housing 108 and threadedly engaged with threaded bores 40 of studs 38. Since there are a plurality of pairs of diametrically positioned threaded inlets 32a–f and holes 126a–f of housings 22 and 108, respectively, and a plurality of diametrically positioned gaps or holes formed in spacer plates 30 and 102, studs 38 can be re-positioned so as to be aligned with preexisting holes already formed in the door to which the lever assembly of the present invention is to be attached. Threaded inlets 32a–f facilitate connection of housings 22 and 108 without forming threaded holes in the door for receiving screws 160. Furthermore, more than two (2) studs 38 can be used to interlock housings 22 and 108 together. Studs 38 pass over or under lock cylinder 16, but do not penetrate cylinder 16.

Cover 104 is positioned intermediate lever 106 and retainer 116 and has a central opening 104a formed therein for receiving shaft portion 106b of lever 106. Cover 104 is structurally identical to cover 27. Periphery portion 104b has a plurality or equidistantly spaced dimples 104c projecting radially inward which are engaged with corresponding grooves (not shown) formed in the periphery of housing 108 thereby preventing cover 104 from being dislodged.

Operation

To simplify the description of the operation of the lever assembly of the present invention, the operation of lever assembly 10 is discussed in terms of subassembly 12. However, the ensuing description is also applicable to subassembly 100.

When the door to which lever assembly 10 is attached is closed, lever 29 is in a substantially horizontal position. In order to open the door, lever 29 is moved downward or upward. Downward movement causes radially extending projection 60, which is engaged with slot 29a of lever 29 and slot 26c of shank portion 26a, to rotate rotatable member 20 so as to wind spring member 18 so that end 72 is moved by protrusion 56 of rotatable member 20 in a clockwise direction, and end 70 of spring member 18 remains positioned adjacent to and in contact with tab 48b of housing 22. Rotatable member 20 rotates within an angular range determined by the distance between tabs 46a and 46b of housing 22. As rotatable member 18 rotates, a torque or rotational load is translated to shank portion 26a so as to retract latch 17 in order to open the door. Rotatable member 20 continues to rotate until projection 58 contacts travel stop tab 46a. Similarly, if lever 29 is moved upward, protrusion 56 of rotatable member 20 moves end 70 of spring 18 counterclockwise until projection 58 contacts travel stop tab 46b. As rotatable member 20 rotates, a torque or rotational load is translated to shank portion 26a in order to retract latch 17.

After lever 29 is released, the tension on spring 18 causes rotatable member 20 to rotate to its original position thereby returning lever 29 to its original, horizontal position.

Thus, the lever assembly of the present invention is relatively less complex in design and thus, relatively less expensive to manufacture because:

a) Only shank portion 26a of shank 26 has threads formed on a portion thereof. Shank portion 26b is not threaded;

b) Studs 38 extend pass over or under lock body or cylinder 16 and do not pass through or penetrate lock body 16. Thus, lock body 16 does not have to be configured to receive studs 38;

c) Retainers 14 and 116 are supported by the tabs formed in housings 22 and 108 and are secured to the housings by staking. Retainers 14 and 116 are substantially planar and have substantially continuous perimetrical edges and do not have radially extending segments formed thereon. Furthermore, retainers 14 and 116 do not have segments extending parallel to shank 26 for positioning between the bent ends of spring member 18. Thus, retainers 14 and 116 are isolated from any rotational loads thereby preventing retainers from becoming loose causing spring members 18 and 112 from becoming dislodged from housings 22 and 108.

d) Housings 22 and 108 do not utilize a stepped portion, as described above, formed on the circular lips extending from the bottom surface of the circular channel. Furthermore, since retainers 14 and 116 do not have the aforementioned extending segments, housings 22 and 108 are configured without means for receiving such segments;

e) Each rotatable member 20 and 110 has only one protrusion formed at the periphery thereof which extends parallel to the shank. Rotatable members 20 and 110 do not have additional protrusions formed on the periphery that is opposite the first protrusion; and f) Spring members 18 and 112 are not coiled springs and thus, cost less to fabricate.

Additionally, each housing member 22 and 108 has multiple pairs of diametrically positioned bolt-openings thereby facilitating attachment to existing bolt-openings in the door to which the lever assembly is to be attached and reducing installation time.

I claim:

1. An improved lever assembly including a lock cylinder having a pair of shank portions, each shank portion defining a slot therein and extending from a respective side of the cylinder, a pair of housings, each housing having a central opening and being mounted to a respective shank portion, each housing having a circular channel formed in one side thereof that is coaxial with the central opening, the channel defining a wall, each housing having a pair of travel stop tabs oppositely formed in and extending from the wall into the circular channel, a pair of annular rotatable members having peripheries, each rotatable member being rotatably disposed within a respective housing channel and defining a projection extending radially inward from the periphery of the rotatable member wherein the projection is engaged with the slot of a respective shank portion, a pair of springs, each spring being mounted on a respective rotatable member, a pair of levers, each of which having a hollow shaft defining a slot wherein the shaft is mounted to a respective shank portion such that the radially extending projection of a corresponding rotatable member is engaged with the slot of the shaft, wherein the improvement comprises:

a lip formed in the channel of each housing and circumferential of the housing central opening, the lip having a substantially planar perimetrical edge; a pair of spring holder tabs oppositely formed in and extending from the channel wall into the channel one of the spring holder tabs extending farther into the channel than the other spring holder tab;

one protrusion formed on the periphery of each rotatable member that extends substantially parallel to the shank each spring having bent ends, the bent ends of each spring engaging simultaneously one spring holder tab of a respective housing member and the protrusion of a respective rotatable member; and one segment extending radially from the periphery of each rotatable member for contacting one of the travel stops.

2. The improved lever assembly of claim 1 wherein the improvement further comprises a pair of retainers, each of which being positioned over the channel of and attached to a respective housing member, each retainer being substantially planar.

3. The improved lever assembly of claim 1 wherein the improvement further comprises a pair of retainers, each of which being positioned over the channel of and attached to a respective housing member, each retainer having a substantially smooth perimetrical edge.

4. The improved lever assembly of claim 1 wherein the improvement further comprises the spring holder tabs of each housing being diametrically positioned with respect to one another.

5. The improved lever assembly of claim 1 wherein the improvement further comprises the bent ends of each spring engaging simultaneously the spring holder tab that extends farther into the channel of a respective housing and the protrusion of a respective rotatable member.

6. The improved lever assembly of claim 1 wherein each spring holder tab has a width and the protrusion of the rotatable member has a width, and wherein the width of each spring holder tab is substantially equal to the width of the protrusion of the rotatable member.

7. The improved lever assembly of claim 1 wherein the improvement further comprises one of the housings having a plurality of pairs of diametrically opposed thru-holes for receiving corresponding fastening screws.

8. The improved lever assembly of claim 7 wherein the other housing has a rear side and a plurality of threaded inlets formed on the rear side thereof and coaxially aligned with the plurality of thru-holes of the one housing.

9. A lever assembly for a door lock comprising:

a lock cylinder having a first side, a second side and a shank having a first portion and second portion extending from said first and second sides, respectively, each shank portion defining a slot;

a pair of spacer plates, each of which having a central opening therethrough and mounted on a respective shank portion and attached to a respective side of the cylinder;

a pair of housing members, each of which being mounted to a respective shank portion, each housing member having front and rear sides and a central opening for receiving a respective shank portion, said rear side of each housing member receiving a respective spacer plate, said housing members being fastened together, each housing member having a circular channel formed in said front side, said channel being coaxial with said central opening and having a wall, each housing member defining a lip in said channel that is circumferential of said central opening of said housing member, said lip having a substantially planar perimetrical edge, each housing having a pair of travel stop tabs and a pair of spring holder tabs, said travel stop tabs being oppositely formed in and extending from said wall into said channel, said spring holder tabs comprising first and second spring holder tabs oppositely formed in and extending from said wall into said channel;

a pair of annular rotatable members having peripheries, each rotatable member having a wall portion and being rotatably mounted on said lip of a respective housing member, each rotatable member having one protrusion formed on the periphery thereof that extends substantially parallel to said shank, a segment extending radially from said rotatable member so as to contact one of said travel stops, and a projection extending radially inward from the periphery of said wall portion of said rotatable member and engaged with said slot of a respective shank portion;

a pair of spring members, each of which mounted on said wall portion of a respective rotatable member, each spring member having bent ends engaging simultaneously said first spring holder tab of a respective housing member and said one protrusion of said respective rotatable member;

a pair of washers, each of which being positioned over a respective spring member, each washer having a central opening for receiving the perimetrical edge of said wall portion of a respective rotatable member a pair of retainers, each of which being positioned over said channel of and attached to said front side of a respective housing member, each retainer being substantially planar and having a substantially smooth perimetrical edge; and a pair of levers, each of which having a hollow shaft defining an elongated slot, said shaft being mounted to a respective shank portion such that said radially extending projection of a corresponding rotatable member is engaged with said slot of said shaft.

10. The lever assembly of claim 9 further including a pair of covers, each cover corresponding to a respective side of a door and having a front side and a rear side, each cover having a peripheral portion inwardly extending substantially parallel to said shank, said peripheral portion and said rear side cooperating to define an interior of said cover, said cover being attached to a respective housing member so that said cover interior receives said respective housing member and so that said retainer is adjacent said rear side of said cover.

11. The lever assembly of claim 9 wherein said first shank portion has a threaded portion adjacent said first side of said cylinder, said lever assembly further comprising a nut threadedly engaged to said threaded portion for fastening said other of said spacer plates against said first side of said cylinder.

12. The lever assembly of claim 9 wherein one of said housing members has a plurality of pairs of diametrically opposed thru-holes for receiving corresponding fastening screws.

13. The lever assembly of claim 12 wherein said plurality of pairs of thru-holes comprises three (3) pairs of thru-holes, three (3) of said thru-holes being positioned in a top portion of said one of said housing members and three (3) of said thru-holes being positioned at a bottom portion of said one of said housing members, each thru-hole being diametrically positioned with respect to a corresponding thru-hole.

14. The lever assembly of claim 13 wherein said three (3) thru-holes at said top portion of said one of said housing members are spaced about 45 degrees apart, and said three (3) thru-holes at said bottom portion of said housing member are spaced about 45 degrees apart.

15. The lever assembly of claim 14 wherein said other of said housing members has a plurality of threaded inlets formed on said rear side thereof and coaxially aligned with said plurality of thru-holes of said one of said housing members.

16. The lever assembly of claim 15 further comprising:

at least two (2) studs, each of which having a threaded end threadedly engaged with a corresponding threaded inlet and a threaded bore formed in the end of said stud opposite said threaded end, said studs extending through said spacer plates; and at least two (2) screws, each of which disposed in a corresponding thru-hole of said one of said housing members and threadedly engaged with said bore of a corresponding stud so as to connect said housing members together.

17. The lever assembly of claim 12 wherein said other of said housing members has a plurality of threaded inlets formed on said rear side thereof, each threaded inlet being coaxially aligned with a corresponding thru-hole.

18. The lever assembly of claim 9 wherein said travel stop tabs of each housing member are less than 180° apart.

19. The lever assembly of claim 9 wherein said spring holder tabs of each housing member are diametrically positioned with respect to one another.

20. The lever assembly of claim 9 wherein said first spring holder tab extends farther into said channel than said second spring holder tab.

21. The lever assembly of claim 9 wherein each spring holder tab and the protrusion of said rotatable member has a width, and wherein the width of each spring holder tab is substantially equal to the width of said protrusion of said rotatable member.

22. The lever assembly of claim 9 wherein said retainers are staked to said housing members.

23. The lever assembly of claim 22 wherein each of said retainers is supported by said travel stop tabs and said spring holder tabs of a respective housing member.

24. The lever assembly of claim 16 wherein said studs are positioned around said lock cylinder.

25. The lever assembly of claim 17 wherein each of said spacer plates has a plurality of openings aligned with said plurality of thru-holes and threaded inlets.

26. The lever assembly of claim 10 wherein each housing member has a periphery and a pair of diametrically positioned grooves formed in the periphery thereof, and each cover has a pair of diametrically positioned dimples formed on said peripheral portion and which extend into said interior, said dimples of said cover being engaged with said grooves of a respective housing member.

27. A lever assembly for a door lock comprising:

a lock cylinder having a first side, a second side and a shank having a first portion and second portion extending from said first and second sides, respectively, each shank portion defining a slot;

a pair of spacer plates, each of which having a central opening therethrough and mounted on a respective shank portion and attached to a respective side of the cylinder;

a pair of housing members, each of which being mounted to a respective shank portion, each housing member having front and rear sides and a central opening for receiving a respective shank portion, said rear side of each housing member receiving a respective spacer plate, said housing members being fastened together, each housing member having a circular channel formed in said front side, said channel being coaxial with said central opening and having a wall, each housing member defining a lip in said channel that is circumferential of said central opening of said housing member, said lip having a substantially planar perimetrical edge, each housing having a pair of travel stop tabs and a pair of spring holder tabs, said travel stop tabs being oppositely formed in and extending from said wall into said channel, said spring holder tabs comprising first and second spring holder tabs oppositely formed in and extending from said wall into said channel, one of said housing members having a plurality of pairs of diametrically opposed thru-holes for receiving corresponding fastening screws, said plurality of pairs of thru-holes comprising three pairs of thru-holes, three of said thru-holes being positioned in a top portion of said one of said housing members and three of said thru-holes being positioned at a bottom portion of said one of said housing members, each thru-hole being diametrically positioned with respect to a corresponding thru-hole;

a pair of annular rotatable members having peripheries, each of which having a wall portion and rotatably mounted on said lip of a respective housing member, each rotatable member having one protrusion formed on the periphery thereof that extends substantially parallel to said shank, a segment extending radially from the periphery of said rotatable member so as to contact one of said travel stops, and a projection extending radially inward from the periphery of said wall portion of said rotatable member and engaged with said slot of a respective shank portion;

a pair of spring members, each of which mounted on said wall portion of a respective rotatable member, each spring member having bent ends engaging simultaneously said first spring holder tab of a respective housing member and said one protrusion of said respective rotatable member;

a pair of retainers, each of which being positioned over said channel of and attached to said front side of a respective housing member, each retainer being substantially planar and having a substantially smooth perimetrical edge; and a pair of levers, each of which having a hollow shaft defining an elongated slot, said shaft being mounted to a respective shank portion such that said radially extending projection of a corresponding rotatable member is engaged with said slot of said shaft.

28. The lever assembly of claim 27 wherein said three thru-holes at said top portion of said one of said housing members are spaced about 45 degrees apart, and said three thru-holes at said bottom portion of said housing member are spaced about 45 degrees apart.

29. The lever assembly of claim 28 wherein said other of said housing members has a plurality of threaded inlets formed on said rear side thereof and coaxially aligned with said plurality of thru-holes of said one of said housing members.

30. The lever assembly of claim 29 further comprising:

at least two studs, each of which having a threaded end threadedly engaged with a corresponding threaded inlet and a threaded bore formed in the end of said stud opposite said threaded end, said studs extending through said spacer plates; and at least two screws, each of which disposed in a corresponding thru-hole of said one of said housing members and threadedly engaged with said bore of a corresponding stud so as to connect said housing members together.

31. The lever assembly of claim 30 wherein said studs are positioned around said lock cylinder.

32. A lever assembly for a door lock comprising:

a lock cylinder having a first side, a second side and a shank having a first portion and second portion extending from said first and second sides, respectively, each shank portion defining a slot;

a pair of spacer plates, each of which having a central opening therethrough and mounted on a respective shank portion and attached to a respective side of the cylinder;

a pair of housing members, each of which being mounted to a respective shank portion, each housing member having front and rear sides and a central opening for receiving a respective shank portion, said rear side of each housing member receiving a respective spacer plate, said housing members being fastened together, each housing member having a circular channel formed in said front side, said channel being coaxial with said central opening and having a wall, each housing member defining a lip in said channel that is circumferential of said central opening of said housing member, said lip having a substantially planar perimetrical edge, each housing having a pair of travel stop tabs and a pair of spring holder tabs, said travel stop tabs being oppositely formed in and extending from said wall into said channel, said spring holder tabs comprising first and second spring holder tabs oppositely formed in and extending from said wall into said channel, said travel stop tabs of each housing member being less than 180° apart;

a pair of annular rotatable members having peripheries, each of which having a wall portion and rotatably mounted on said lip of a respective housing member, each rotatable member having one protrusion formed on the periphery thereof that extends substantially parallel to said shank, a segment extending radially from the periphery of said rotatable member so as to contact one of said travel stops, and a projection extending radially inward from the periphery of said wall portion of said rotatable member and engaged with said slot of a respective shank portion;

a pair of spring members, each of which mounted on said wall portion of a respective rotatable member, each spring member having bent ends engaging simultaneously said first spring holder tab of a respective housing member and said one protrusion of said respective rotatable member;

a pair of retainers, each of which being positioned over said channel of and attached to said front side of a respective housing member, each retainer being substantially planar and having a substantially smooth perimetrical edge; and a pair of levers, each of which having a hollow shaft defining an elongated slot, said shaft being mounted to a respective shank portion such that said radially extending projection of a corresponding rotatable member is engaged with said slot of said shaft.

33. A lever assembly for a door lock comprising:

a lock cylinder having a first side, a second side and a shank having a first portion and second portion extending from said first and second sides, respectively, each shank portion defining a slot;

a pair of spacer plates, each of which having a central opening therethrough and mounted on a respective shank portion and attached to a respective side of the cylinder;

a pair of housing members, each of which being mounted to a respective shank portion, each housing member having front and rear sides and a central opening for receiving a respective shank portion, said rear side of each housing member receiving a respective spacer plate, said housing members being fastened together, each housing member having a circular channel formed in said front side, said channel being coaxial with said central opening and having a wall, each housing member defining a lip in said channel that is circumferential of said central opening of said housing member, said lip having a substantially planar perimetrical edge, each housing having a pair of travel stop tabs and a pair of spring holder tabs, said travel stop tabs being oppositely formed in and extending from said wall into said channel, said spring holder tabs comprising first and second spring holder tabs oppositely formed in and extending from said wall into said channel, said first spring holder tab extending farther into said channel than said second spring holder tab;

a pair of annular rotatable members having peripheries, each of which having a wall portion and rotatably mounted on said lip of a respective housing member, each rotatable member having one protrusion formed on the periphery thereof that extends substantially parallel to said shank, a segment extending radially from the periphery of said rotatable member so as to contact one of said travel stops, and a projection extending radially inward from the periphery of said wall portion of said rotatable member and engaged with said slot of a respective shank portion;

a pair of spring members, each of which mounted on said wall portion of a respective rotatable member, each spring member having bent ends engaging simultaneously said first spring holder tab of a respective housing member and said one protrusion of said respective rotatable member;

a pair of retainers, each of which being positioned over said channel of and attached to said front side of a respective housing member, each retainer being substantially planar and having a substantially smooth perimetrical edge; and a pair of levers, each of which having a hollow shaft defining an elongated slot, said shaft being mounted to a respective shank portion such that said radially extending projection of a corresponding rotatable member is engaged with said slot of said shaft.

34. A lever assembly for a door lock comprising:

a lock cylinder having a first side, a second side and a shank having a first portion and second portion extending from said first and second sides, respectively, each shank portion defining a slot;

a pair of spacer plates, each of which having a central opening therethrough and mounted on a respective shank portion and attached to a respective side of the cylinder;

a pair of housing members, each of which being mounted to a respective shank portion, each housing member having front and rear sides and a central opening for receiving a respective shank portion, said rear side of each housing member receiving a respective spacer plate, said housing members being fastened together, each housing member having a circular channel formed in said front side, said channel being coaxial with said central opening and having a wall, each housing member defining a lip in said channel that is circumferential of said central opening of said housing member, said lip having a substantially planar perimetrical edge, each housing having a pair of travel stop tabs and a pair of spring holder tabs, said travel stop tabs being oppositely formed in and extending from said wall into said channel, said spring holder tabs comprising first and second spring holder tabs oppositely formed in and extending from said wall into said channel, one of said housing members having a plurality of pairs of diametrically opposed thru-holes for receiving corresponding fastening screws, said plurality of pairs of thru-holes comprising three pairs of thru-holes, three of said thru-holes being positioned in a top portion of said one of said housing members and three of said thru-holes being positioned at a bottom portion of said one of said housing members, each thru-hole being diametrically positioned with respect to a corresponding thru-hole, said three thru-holes at said top portion of said one of said housing members being spaced about 45 degrees apart, and said three thru-holes at said bottom portion of said housing member being spaced about 45 degrees apart, said other of said housing members having a plurality of threaded inlets formed on said rear side thereof and coaxially aligned with said plurality of thru-holes of said one of said housing members;

a pair of annular rotatable members having peripheries, each of which having a wall portion and rotatably mounted on said lip of a respective housing member, each rotatable member having one protrusion formed on the periphery thereof that extends substantially parallel to said shank, a segment extending radially from the periphery of said rotatable member so as to contact one of said travel stops, and a projection extending radially inward from the periphery of said wall portion of said rotatable member and engaged with said slot of a respective shank portion;

a pair of spring members, each of which mounted on said wall portion of a respective rotatable member, each spring member having bent ends engaging simultaneously said first spring holder tab of a respective housing member and said one protrusion of said respective rotatable member;

at least two studs, each of which having a threaded end threadedly engaged with a corresponding threaded inlet and a threaded bore formed in the end of said stud opposite said threaded end, said studs extending through said spacer plates and being positioned around said lock cylinder; and at least two screws, each of which disposed in a corresponding thru-hole of said one of said housing members and threadedly engaged with said bore of a corresponding stud so as to connect said housing members together;

a pair of retainers, each of which being positioned over said channel of and attached to said front side of a respective housing member, each retainer being substantially planar and having a substantially smooth perimetrical edge; and a pair of levers, each of which having a hollow shaft defining an elongated slot, said shaft being mounted to a respective shank portion such that said radially extending projection of a corresponding rotatable member is engaged with said slot of said shaft.

* * * * *